(12) United States Patent
Wu et al.

(10) Patent No.: US 11,631,073 B2
(45) Date of Patent: Apr. 18, 2023

(54) RECOMMENDATION ENGINE FOR BILL SPLITTING

(71) Applicant: Capital One Services, LLC, McLean, VA (US)

(72) Inventors: Angelina Wu, Vienna, VA (US); Lin Ni Lisa Cheng, Fresh Meadow, NJ (US)

(73) Assignee: Capital One Services, LLC, McLean, VA (US)

( * ) Notice: Subject to any disclaimer, the term of this patent is extended or adjusted under 35 U.S.C. 154(b) by 122 days.

(21) Appl. No.: 16/918,618

(22) Filed: Jul. 1, 2020

(65) Prior Publication Data
US 2022/0005016 A1  Jan. 6, 2022

(51) Int. Cl.
*G06Q 20/00* (2012.01)
*G06Q 20/22* (2012.01)
*G06N 20/20* (2019.01)
*G06V 30/40* (2022.01)
*G06Q 50/00* (2012.01)
*G06V 30/10* (2022.01)

(52) U.S. Cl.
CPC ............ *G06Q 20/29* (2013.01); *G06N 20/20* (2019.01); *G06V 30/40* (2022.01); *G06Q 50/01* (2013.01); *G06V 30/10* (2022.01)

(58) Field of Classification Search
USPC .................................................. 705/39, 35
See application file for complete search history.

(56) References Cited

U.S. PATENT DOCUMENTS 10,002,337 B2  6/2018  Siddique et al.
10,346,824 B2  7/2019  Chan et al.
(Continued)

FOREIGN PATENT DOCUMENTS

CA  2993310 A1 *  3/2018  .......... G06F 11/3006
CA  3058069 A1 *  4/2020  .......... G06Q 20/3223
(Continued)

OTHER PUBLICATIONS

Splitwise, Inc., "Splitwise—Split expenses with friends", Available from the Internet at https://apps.apple.com/us/app/splitwise/id458023433, Version 5.1.1 released on Nov. 22, 2019, pp. 1-3.
(Continued)

*Primary Examiner* — William E Rankins
(74) *Attorney, Agent, or Firm* — Sterne, Kessler, Goldstein & Fox P.L.L.C.

(57) ABSTRACT

Disclosed herein are system, method, and computer program product embodiments for providing recommendations for splitting bills. The approaches disclosed include the ability to obtain information about a bill to be split (such as a photo of the bill), and then use several machine learning models to determine the 'who,' 'what,' and 'where' of the underlying transaction. In particular, machine learning models described herein are used to perform facial recognition of a 'selfie' taken when a transaction was made against social media accounts to determine participants of the transaction. The machine learning models may also identify expected pricing from data about a merchant associated with the transaction, and expected amounts for each participant based on the expected pricing.

20 Claims, 7 Drawing Sheets

100

(56) References Cited

U.S. PATENT DOCUMENTS

| | | | |
|---|---|---|---|
| 10,540,646 B2 | 1/2020 | Schlosser et al. | |
| 10,636,241 B1* | 4/2020 | Rule | G07F 7/0893 |
| 10,810,574 B1* | 10/2020 | Wilson | G06Q 20/389 |
| 10,839,060 B1* | 11/2020 | Hurlocker | H04L 63/0861 |
| 10,909,582 B1* | 2/2021 | Brandt | G06Q 20/3267 |
| 10,915,881 B2 | 2/2021 | Kumar et al. | |
| 11,132,661 B1* | 9/2021 | White, III | H04M 15/7652 |
| 2014/0156517 A1 | 6/2014 | Argue et al. | |
| 2014/0222663 A1 | 8/2014 | Park et al. | |
| 2014/0328521 A1 | 11/2014 | Colangelo | |
| 2015/0095228 A1* | 4/2015 | Su | G06Q 20/3276 |
| | | | 705/44 |
| 2015/0235218 A1 | 8/2015 | Murphy, Jr. et al. | |
| 2016/0109954 A1* | 4/2016 | Harris | H04L 63/0861 |
| | | | 345/156 |
| 2016/0180316 A1* | 6/2016 | Wang | G06Q 20/223 |
| | | | 705/39 |
| 2017/0124540 A1 | 5/2017 | Chan et al. | |
| 2017/0372282 A1* | 12/2017 | Sarin | G06Q 20/102 |
| 2018/0025340 A1 | 1/2018 | Schlosser et al. | |
| 2018/0096321 A1 | 4/2018 | Haldenby et al. | |
| 2018/0121828 A1 | 5/2018 | Keysers et al. | |
| 2018/0285859 A1* | 10/2018 | Jiang | G06Q 30/0215 |
| 2019/0139280 A1* | 5/2019 | Hubel | G06V 30/412 |
| 2020/0111096 A1* | 4/2020 | Liu | G06N 5/022 |
| 2020/0111103 A1* | 4/2020 | Kalaboukis | G06Q 20/4014 |
| 2020/0265409 A1* | 8/2020 | Babu | G06N 20/00 |
| 2020/0311709 A1* | 10/2020 | White, III | G06Q 20/3224 |
| 2020/0334724 A1* | 10/2020 | Garrett | H04L 67/20 |
| 2021/0158323 A1* | 5/2021 | Mimassi | G06Q 50/12 |
| 2021/0200998 A1 | 7/2021 | Ghose et al. | |
| 2021/0319424 A1* | 10/2021 | Shah | G06Q 20/3224 |
| 2022/0005045 A1 | 1/2022 | Wu et al. | |

FOREIGN PATENT DOCUMENTS

| | | | | | |
|---|---|---|---|---|---|
| CA | 2910788 C | * | 1/2021 | | G06K 9/00288 |
| CN | 104951935 B | * | 3/2021 | | |
| JP | 2019149027 A | * | 9/2019 | | |
| WO | WO-2013103912 A1 | * | 7/2013 | | G02B 27/017 |

OTHER PUBLICATIONS

Laryea, Brittney et al., "The best apps for splitting the check when you don't want to divvy it up evenly", Available from the Internet at https://www.businessinsider.com/the-best-apps-for-splitting-the-check-rent-and-group-trips-2018-4, Apr. 27, 2018, pp. 1-10.

* cited by examiner

RECOMMENDATION ENGINE FOR BILL SPLITTING

BACKGROUND

As electronic payment systems continue to evolve, applications that provide the ability to conduct transactions quickly and on a more personal level have become commonplace. Today, it is possible to use a variety of apps on a smartphone or browser, such as Zelle, PayPal, or Venmo, to electronically transfer money to, or receive money from, personal accounts, including checking accounts, debit cards, and credit cards.

Despite the ease of the process of transferring money itself, calculating and generating the transaction remains inconvenient in many situations. Accordingly, solutions are needed to broaden applications for rapid transfers of funds in relation to complex scenarios.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

As friends gather together over lunch or dinner to share a meal at a restaurant, they will inevitably encounter the unpleasant interruption of having to pay for the bill. In a simple case, an individual may volunteer to pick up the tab for everyone. More commonly, the party may ask the restaurant to split the bill—which can be frustrating for the wait staff if not handled in advance. In some instances, restaurants do not permit bill splitting at all, or limit the number of ways they will split the bill, to minimize the impact on wait staff of figuring out individual bills after the fact as well as per-transaction surcharges imposed by a bank. Regardless of how it is handled, manually splitting a bill is typically handled by sorting through what items everyone purchased and determining what each individual owes.

If paying the restaurant on a single combined bill, one individual in the party can pay the entire bill and receive remuneration from the others. Many of the intervening transactions in this process will be handled electronically. The payment to the restaurant may, increasingly, be handled through an entirely electronic payment process, but can also be handled using a physical credit card or other approach. The payments between the individual diners will likely be handled through an electronic payment, or in some cases settled as a cash transaction. Despite the flexibility offered by electronic transactions, the bill splitting complications remain a largely manual process. Provided herein are system, apparatus, device, method and/or computer program product embodiments, and/or combinations and sub-combinations thereof, for electronic bill splitting and participant identification.

Figure 1:
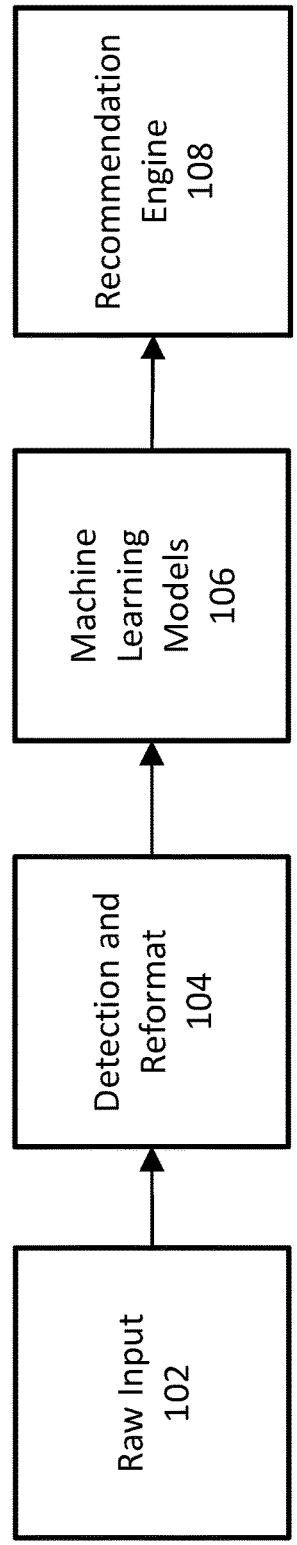
FIG. 1 is an exemplary machine learning (ML) architecture for bill splitting detection, in accordance with an embodiment.

FIG. 1 is an exemplary machine learning (ML) architecture 100 for bill splitting detection, in accordance with an embodiment. ML architecture 100 is able to receive raw input 102 as the information used to derivate parameters for splitting a bill. Raw input 102 can include information directly usable to determine how to split a bill, such as the bill itself, the items purchased by each individual participant in the underlying transaction, and identifying information for the individual participants, by way of non-limiting example. In more complicated scenarios, raw input 102 may not include information directly usable to determine how to split a bill, but rather information from which that information can be derived indirectly, such as a photo of the bill, access to social media postings about the transaction, and historical transaction information, by way of non-limiting example.

Regardless of the form in which the raw data used in bill splitting is received, it is detected and reformatted by component 104 in order to standardize the information for storage and later use. For example, image-based data may be processed through optical character recognition (OCR) in order to produce a text-based representation of the data therein. In the case of a bill, this could include text-based representations of transaction information regarding a total amount of the bill, a date of the bill, a name of a merchant, and even individual items and costs for those items that are part of the transaction, which would be shown on the face of the bill. This transaction information can be stored in appropriate fields of a data structure corresponding to the transaction (e.g., the total amount can be stored in a field corresponding to the total, the individual items and their respective costs can be stored in a list of items, etc.) either during the initial processing, or at a later time when it is accessed. Alternatively, it may be stored as raw text.

Machine learning models 106 are configured to retrieve the standardized data as an input and, by channeling the information to appropriate models of machine learning models 106, determine from the standardized data the parameters needed for bill splitting. For example, machine learning models 106 can be used to determine parameters such as who participated in the underlying transaction, how much each participant is responsible for, and expected amounts for individual transactions for a given merchant. And, with all of the parameters produced by machine learning models 106, recommendation engine 108 is configured to recommend a bill splitting transaction (and, optionally, facilitate the bill splitting transaction itself).

While examples detailed herein will generally be discussed in the context of splitting a bill among friends at a restaurant, this approach can be used for splitting costs among participants in any number of transactions, as will be understood by one skilled in the relevant arts. For example, ML architecture 100 can be used to rapidly and accurately split costs in a transaction for bulk purchases by multiple customers in order to receive bulk discounts. In another example, ML architecture 100 can be used to rapidly and accurately split a utility bill with other members of a household. ML architecture 100 can also be used to review transaction data and recommend that bill splitting be performed, based on factors such as historical transaction data, expected costs, and participants in the transaction.

Figure 2:
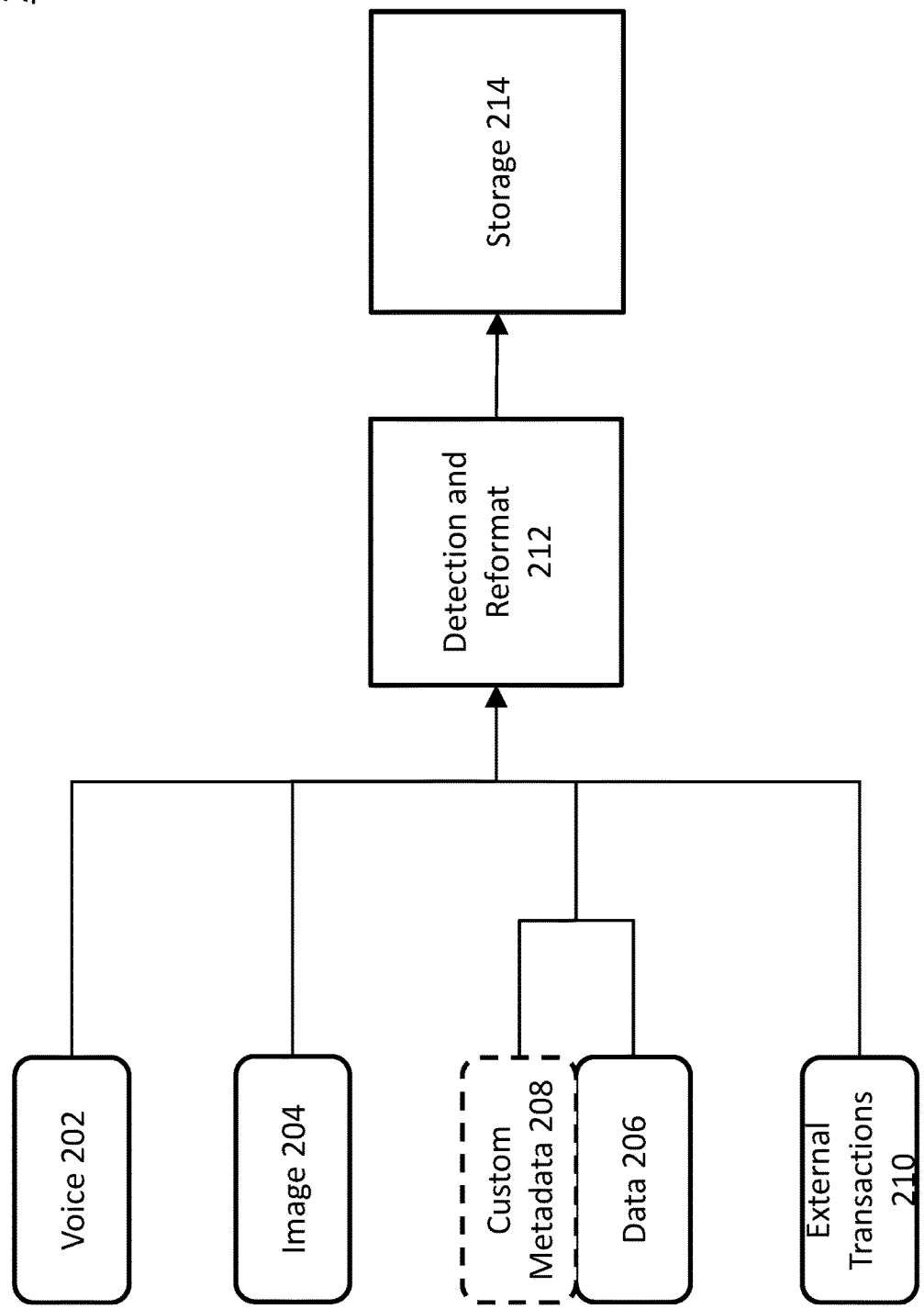
FIG. 2 illustrates a data gathering architecture, in accordance with an embodiment.

FIG. 2 illustrates a data gathering architecture 200, in accordance with an embodiment. Data gathering architecture 200 is configured to retrieve raw information from a variety of sources used to determine whether to execute a bill split on a transaction, how to allocate amounts of a bill split to participants in the transaction, or both. In accordance with an embodiment, data gathering architecture 200 retrieves this raw information as it is captured by a user (e.g., as photos of a bill are taken, as selfies of participants to a transaction are taken, etc.), or a user may be prompted to capture this information upon request of a bill split transaction (initiated manually by a user, or automatically by an agent). One skilled in the relevant arts will appreciate that various levels of control are possible for data gathering architecture 200, including controls that take into consideration privacy requirements for an individual user, or as mandated by law.

Data gathering architecture 200 includes voice component 202, in an embodiment. Voice component 202 captures raw voice interactions that can contain bill splitting instructions, such as a specific request by a user to capture a transaction in the amount of $50.00 at a certain date and time, and listing certain participants to the transaction. Information from voice component 202 can be captured for use in bill splitting by performing voice-to-text processing to standardize the information contained therein by detection and reformat component 212, in accordance with an embodiment. In accordance with an additional embodiment, voice component 202 may capture specific voice commands, such as an expected 'split bill' command. In the case of specific voice commands, they may include one or more expected parameters, such as numbers of participants (e.g., 'split bill 5 ways'), or even custom amounts for splits (e.g., 'split bill $10, $20, $20'). In accordance with an embodiment, the data captured from voice component 202 may be provided to an agent, such as a virtual agent, for processing of any commands included with the data. By way of non-limiting example, the agent can be interfaced with by voice commands through a banking app, or by text-based communication such as a chat or SMS messaging.

Image component 204 is able to capture raw image data used for bill splitting, in accordance with an embodiment. Image component 204 may be used to capture, for example, a photo of a restaurant bill to be split among participants. Image component 204 may also be used to take a photo of participants to the transaction (e.g., a 'selfie' of diners at a restaurant). In the case of image-based textual information, such as a restaurant bill, the photo can be processed through OCR in order to detect raw text in the bill. In an embodiment, the raw text on the bill corresponds to text-based transaction information, which can be used by detection and reformat component 212 to populate transaction information fields relating to a total amount of the bill, a date of the bill, a name of a merchant, and even individual items and costs for those items that are part of the transaction. In a further embodiment, detection and reformat component 212 stores the text-based transaction information in a format (e.g., plain text) that is used for later processing (such as in transaction information fields), performed when a bill split transaction is initiated.

Data component 206, coupled with custom metadata component 208, is able to provide raw data regarding the transaction that has been tagged with user metadata. In accordance with an embodiment, this user metadata captures user notes about the transaction (e.g., reminders) that can optionally be presented to the user when a bill split recommendation is made in order to aid with understanding the bill split recommendation.

For example, an agent may identify a bill split transaction and request further information about the transaction (i.e., metadata) from a user, to which the user may supply an annotation like 'John's $40^{th}$ Birthday Party' that would be a helpful reminder about the transaction. Or, the user may choose to provide this metadata on their own, such as by speaking to the agent using voice data 202. As in the earlier example of 'split bill 5 ways', in addition to this command being provided to the agent, its contents can be held as the metadata for later review by the user. In addition to providing the user metadata from custom metadata component 208 to the user when the bill split recommendation is made, the user metadata provided by custom metadata component 208 may optionally be used by machine learning models 106 of FIG. 1. The data and metadata are provided to detection and reformat component 212 for standardization.

External transactions component 210 is configured to interface with external transaction sources (e.g., Amazon, OpenTable, a utility service provider (e.g., electric or water company), etc.) where payments are made directly on an external platform, through an application programming interface (API) corresponding to the transaction source. In an embodiment, the raw transaction information may be scraped from a website of the external transaction sources. The raw transaction information may correspond to (as with a physical bill) transaction information fields relating to a total amount of the bill, a date of the bill, a name of a merchant, and even individual items and costs for those items that are part of the transaction. The retrieved transaction data is provided to detection and reformat component 212 for standardization.

With the information from components 202, 204, 206, and 210 standardized by detection and reformat component 212, standardized information can then be stored in storage 214 for later retrieval and usage by the machine learning models, such as machine learning models 106 of FIG. 1.

Figure 3:
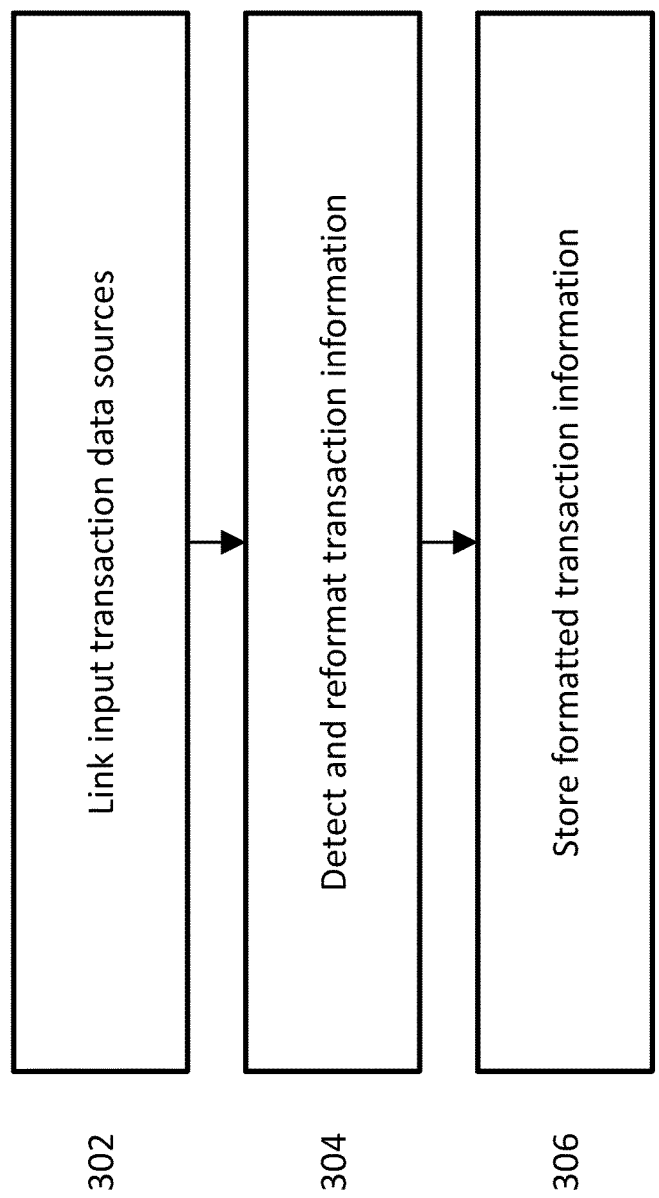
FIG. 3 is a flowchart illustrating steps by which input data can be prepared for bill splitting processing, in accordance with an embodiment.

FIG. 3 is a flowchart 300 illustrating steps by which input data can be prepared for bill splitting processing, in accordance with an embodiment. The process begins at step 302 where input transaction data sources are linked for access. This entails, for example, connecting external transactions component 210 to a particular transaction source via an API, and receiving transaction information from that data source, or connecting to a photo component to receive images.

At step 304, transaction information is detected and reformatted, in accordance with an embodiment. For example, a bill that has been received as an image from image component 204 can undergo OCR, and text from the OCR-processed bill can be stored in a text file for later access and further interpretation. In an embodiment, reformatting may include identifying specific information from the various input data and storing it in corresponding data fields, such as detecting a total amount for the bill from the OCR-processed text and storing it in a total amount field. In a further embodiment, the input data may be stored in a folder or other format that associates the input data from a plurality of sources with a single transaction. One skilled in the relevant arts will appreciate that this detection and reformatting can include other types of data, such as, for example, individual items in an itemized bill and their individual prices. With the transaction information reformatted into a standardized manner, the transaction information is stored at step 306 for use by machine learning models 106 of FIG. 1.

Figure 4:
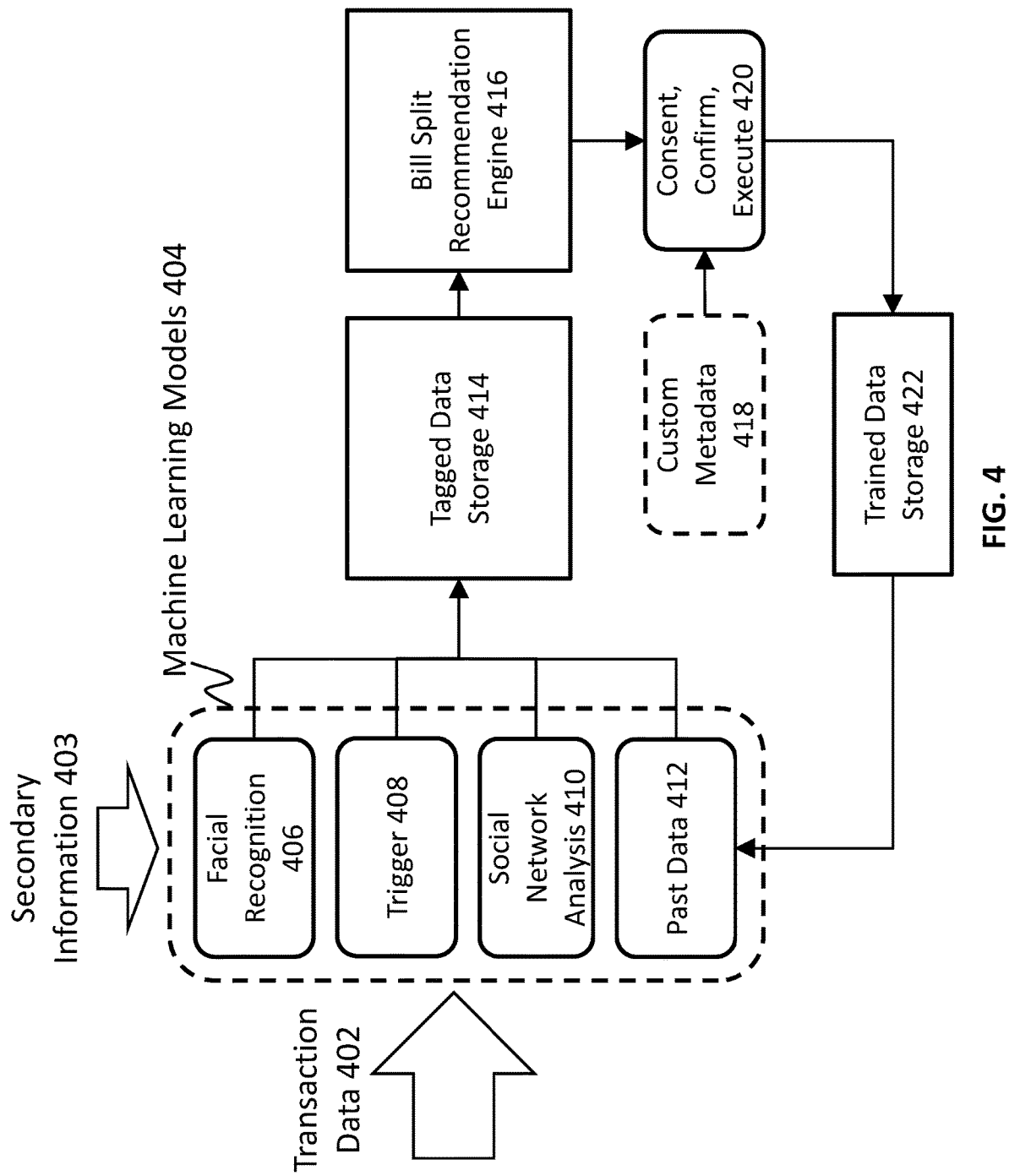
FIG. 4 illustrates a bill split recommendation architecture, in accordance with an embodiment.

FIG. 4 illustrates a bill split recommendation architecture 400, in accordance with an embodiment. Architecture 400 includes transaction data 402 and secondary information 403, which are used as inputs for machine learning models 404. In accordance with an embodiment, bill split recommendation architecture 400 is operated by, or integrated with, a banking system configured to receive merchant charges (such as charges made against a credit or debit card) as transaction data 402. Transaction data 402 includes information such as an amount of a charge, a name of the merchant, a timestamp for the transaction, and other such information as would normally be available to a banking system that processes charges. Typically, transaction data 402 for a given transaction is received at the time a charge is made and authorized—such as when a credit card is swiped for payment at a restaurant.

Secondary information 403 includes any additional information that can be used and accessed by machine learning models 404, and the contents of secondary information 403 can vary with respect to a given machine learning model 404. Various exemplary forms of secondary information 403 are described in more detail below with respect to the various machine learning models 404, but can include transaction data held in storage 214 of FIG. 2, as well as additional data accessed from external sources such as, for example, social media accounts.

In accordance with an embodiment, machine learning models 404 are individually trained through supervised learning. Some non-limiting examples of supervised learning models include, for example and without limitation, nearest neighbor, naïve Bayes, decision trees, support vector machines, neural networks, or any machine learning algorithm suitable for classification problems. By structuring architecture 400 into individual machine learning models 404, it is possible to train models to provide specific answers to questions that should be answered in order to improve the accuracy of a bill splitting transaction. For example, when a bill is split, it is useful to identify the 'who,' 'what,' and 'where' of the transaction—e.g., who was involved in the transaction, what items are part of the transaction, where did the transaction take place—in order to determine an appropriate allocation per individual, for the items they purchased, at a cost expected for the location of the transaction.

In each of the examples below describing the operation of machine learning models 404 (e.g., facial recognition model 406, trigger model 408, social network analysis model 410, and past data model 412), transaction data 402 is used as the source for a given transaction. When a transaction is received as transaction data 402, one or more of machine learning models 404 may be executed in order to identify whether to recommend splitting the transaction, and/or how to split the transaction. Which machine learning models 404 are executed is determined based on what information (of the 'who,' 'what,' and 'where') is needed in order to provide the recommendation to perform a bill split, and/or how to perform the bill split. In some situations, as will be recognized by one skilled in the relevant art, this needed information can be determined either solely from transaction data 402 (in which case execution of machine learning models 404 may not be performed), or from a subset of machine learning models 404, in accordance with an embodiment.

Facial recognition model 406 is configured to principally determine information regarding who was involved with the transaction of transaction data 402, and where the transaction took place, in accordance with an embodiment. Facial recognition model 406 may obtain an image, via secondary information 403 for example, taken in relation to the transaction in order to identify individuals present when the transaction was undertaken. A list of names can then be provided to allow selection of those individuals that will be splitting the bill. These names can be sourced from a user's contacts, such as contacts within a banking application implementing an agent used for interacting with bill split recommendation architecture 400, or an external source such as a social media platform.

For example, a group of friends dining out a restaurant may take a group 'selfie'—a photo at the restaurant of everyone in the group. This selfie may be processed via image component 204, detection and reformat component 212, and storage 214 of FIG. 2, in accordance with an embodiment. Facial recognition model 406 can then identify individual faces within the photo.

In accordance with an embodiment, a camera application on a user's mobile device can be initiated for the purpose of taking the group photo whenever a transaction to be split is identified, such as when a charge is made with a restaurant, or when the user selects an option to split a bill. For example, when a credit card charge is made and received through transaction data 402, facial recognition model 406 may signal the mobile device to present the user with an option to take a selfie that it can use for facial recognition.

Additional secondary information 403 used by facial recognition model 406 may include, for example, social media information relating to the photo. For example, if the photo is geotagged, the geotag may be used to determine a merchant from a location associated with the geotag. Other identifying information regarding the merchant location may also be used to identify the merchant.

Additionally, it is likely that a user taking the photo is connected to one or more of the individuals in the photo on one or more forms of social media. Facial recognition model 406 can receive information regarding connections, such as a friends list from a social media site, as part of secondary information 403. This friends list may include photos associated with each friend in the friends list. Additionally, information regarding connections from a social media platform may include any photos that are tagged with individual names. One skilled in the relevant arts will appreciate that other tagged photos may be used, such as phone contacts associated with a photo, contacts within a banking app, and the social media example is provided by way of example and not limitation.

With the photos received from the social media platform, it is possible for facial recognition model 406 to compare faces detected in the group selfie with faces received from the user's social media connections, in order to identify individual participants in the transaction (as the selfie was taken contemporaneous to the transaction). Alternatively, the group photo may be transmitted to a third party platform, such as the social media platform itself, for comparison to images stored on the platform and associated with an individual. The third party platform may then return a list of contacts associated with individuals identified in the group photo.

A list of any identified participants and/or an identified merchant by facial recognition model 406 can be provided to tagged data storage 414, in accordance with an embodiment.

Figure 5:
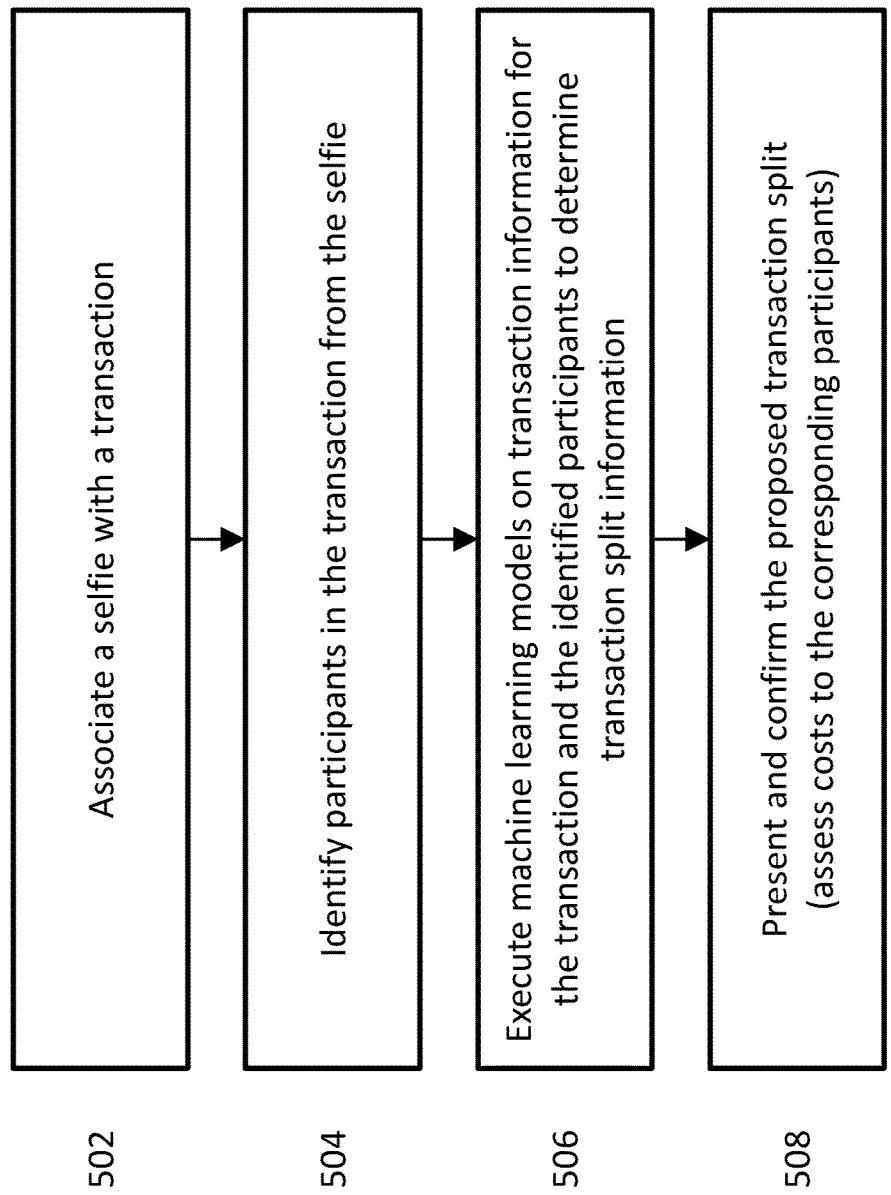
FIG. 5 is a flowchart illustrating steps by which individuals participating in a transaction can be identified, in accordance with an embodiment.

FIG. 5 is a flowchart 500 illustrating steps by which individuals participating in a transaction can be identified, in accordance with an embodiment. In an embodiment, flowchart 500 is carried out by facial recognition model 406, although one skilled in the relevant arts will appreciate that the functionality described herein can be distributed across other machine learning models.

At step 502, a group image (a 'selfie') is associated with a transaction. This association can be carried out in a variety of ways, all contemplated within the scope of this disclosure. For example, a user may access a mobile app for bill splitting, and will be prompted to take the group image as part of a bill splitting process (and may also be asked to take other photos, such as of the bill itself). Alternatively, the user may be automatically prompted to take the group image when taking a photo of the bill, or when a charge is made (e.g., a charge identified as expected to be split, such as a restaurant bill payment). The selfie may or may not include all participants in the transaction, and need not be a true selfie in the sense that the user of a mobile device used for capturing the group image may themselves not be in the photo (e.g., when taking a group photo using a rear facing camera of a mobile device).

The user may also take the group image consistent with how photos are normally taken using their mobile device, for later association with the transaction (e.g., by timestamp, geotag, or other metadata) using a built-in photo application. A bill splitting application can then identify the photo as associated with the transaction by, for example, looking for photos having a timestamp on or near a time on a receipt associated with the transaction, or by looking for photos geotagged with a location matching or near an address associated with a merchant for the transaction.

At step 504, participants associated with the transaction are identified from the selfie. As previously noted, facial recognition model 406 of FIG. 4 may receive secondary information 403 that includes social media account information. This information can be used by facial recognition model 406 to associate faces identified in the selfie with contacts accessed from the secondary information 403. Facial recognition model 406 may also receive secondary information 403 that includes profile information (including a profile photo) from other participants' accounts on a banking application.

At step 506, one or more additional machine learning models are executed to determine transaction split information, and at step 508 a proposed transaction split recommendation is made, and can be presented to a user for confirmation. These steps are described in further detail with respect to FIG. 6 below, in the context of multiple machine learning models 404 of FIG. 4.

Facial recognition model 406 is supported by (or substituted by, in the absence of a selfie) additional machine learning models of machine learning models 404. For example, machine learning models 404 may optionally include trigger model 408, social network analysis model 410, and past data model 412.

Trigger model 408 is trained and configured to provide information regarding what has been purchased in a transaction, and how much an individual participant to the transaction would be expected to pay. For example, if the transaction is categorized as a restaurant transaction, trigger model 408 may access secondary information about the transaction from a service such as Yelp or OpenTable to identify individual menu item prices, or average prices per meal. If the total cost obtained from transaction data 402 is larger than expected for a single individual using the expected prices from these services, that can be a trigger to suggest to a user that the transaction may need to be split, and can also be used to estimate how many ways the transaction should be split (if it is to be split—either based on its own recommendation or through a manual bill split request). One skilled in the relevant arts will appreciate that other such services, both external and internal, may be accessed to determine an expected per-participant cost.

Trigger model 408 is also trained to identify recurring transactions in transaction data 402, and can reference information from past data model 402 (through tagged data storage 414) to determine that the transaction is recurring. If the prior transactions have been split, this information can be used to recommend that the present transaction also be split. However, if the amount of the transaction is unexpectedly high or low (based on past data), trigger model 408 may recommend splitting with additional (or fewer) participants. This information about the transaction can be provided to tagged data storage 414, in accordance with an embodiment.

Social network analysis model 410 is trained and configured to provide information regarding past behaviors of identified participants to the transaction, as well as mechanisms for requesting payment for the bill split transaction. For example, social network analysis model 410 may access secondary information from a service such as Zelle, Venmo, or PayPal to determine behaviors of the participants to the transaction, and refine a bill split recommendation using the expected per-participant cost from trigger model 408. This information about the participants can be provided to tagged data storage 414, in accordance with an embodiment.

Past data model 412 is used to further refine decisions regarding participants to the bill split transaction and allocations for each. This includes, for example, a list of categories of transactions for which a bill split is typically performed, individuals with whom bill splitting is typically carried out, and other historical information that can further refine the results provided by machine learning models 404. This refined information about the transaction can be provided to tagged data storage 414, in accordance with an embodiment.

In accordance with an embodiment, and as described above, outputs from the various executed machine learning models 404 is stored in tagged data storage 414 for use by other machine learning models 404, as needed, and by bill split recommendation engine 416. This information can be formatted to match individual fields needed for performing the recommendation, and can be arranged, by way of non-limiting example, in a JavaScript Object Notation (JSON) dictionary format or other format as would be readily appreciated by one skilled in the relevant arts.

Bill split recommendation engine 416 is configured to obtain tagged data provided by machine learning models 404 and held in tagged data storage 414, in accordance with an embodiment. Bill split recommendation engine 416 is able to determine (and recommend) whether to initiate a bill split transaction and/or the parameters of a bill split recommendation (e.g., who owes what). A determination to carry out a bill split transaction may occur manually (e.g., if a user instructs the bill split recommendation engine 416 to initiate a bill split transaction, such as through an interaction with an agent), or automatically. To automatically initiate a bill split transaction, bill split recommendation engine 416 is configured to identify conditions where bill splitting is expected.

For example, if a charge is identified for a category of transaction where a user usually splits a bill (as identified by past data model 412), bill split recommendation engine 416 may present a user with a prompt indicating that the transaction was identified, and asking whether to proceed with bill splitting. Alternatively, bill split recommendation engine

416 may automatically perform bill splitting on the transaction and provide a recommendation to the user.

When a bill split transaction is initiated, bill split recommendation engine 416 is able to gather tagged data from tagged data storage 414 to know the 'who,' 'what,' and 'where' of the transaction. For example, bill split recommendation engine 416 can obtain tagged data from facial recognition model 406 to identify participants in the transaction and their contact information, tagged data from trigger model 408 to identify the expected split for each of the identified participants, and tagged data from social network analysis 410 to determine how to initiate a bill split transaction directly with the identified participants. Bill split recommendation engine 416 may also adjust this information based on data from past data model 412, as appropriate.

As an example, bill split recommendation engine 416 may recognize that an incoming charge is associated with a merchant that is categorized as a restaurant. Bill split recommendation engine 416 may then search tagged data storage 414 for facial recognition results from facial recognition model 406 associated with the transaction. Bill split recommendation engine can access trigger data from trigger model 408 regarding the merchant to determine average prices for menu items at the merchant restaurant, and can adjust expected charges based on the average prices using data from social network analysis model 410 and past data model 412, as needed.

In accordance with an embodiment, bill split recommendation engine 416 requests information from a subset of machine learning models 404 sufficient to provide its recommendation. This can be implemented, for example, by organizing the machine learning models 404 into a hierarchy. In one scenario, recurring transactions that should be split can be identified and configured for bill splitting in trigger model 408, such that when a matching future transaction in transaction data 402 is received, only trigger model 408 needs to execute—trigger model 408 alone can both recommend that the transaction be split, and recommend the amount of the split. For example, if a user splits their electricity bill every month with a roommate, this behavior can be readily identified and handled by the trigger model 408, and there is no need to consult facial recognition model 406 or social network analysis model 410 to resolve the bill split recommendation, for example.

Next in the hierarchy, if a corresponding result cannot be found by trigger model 408, then past data model 412 can be consulted to recommend whether to split a transaction, and how, based on historical information. If sufficient historical information to make this recommendation does not exist, then models that rely more heavily on secondary information 403, such as facial recognition model 406 and social network analysis model 410 are consulted.

Bill split recommendation engine can provide a proposed bill split to consent, confirm, and execute component 420, for presentation to and verification by a user. If the user accepts, requests can be sent to the identified individuals using a bill pay app, by way of non-limiting example, on an account identified by social network analysis model 410.

Custom metadata component 418 allows a user to enter notes regarding the recommendation provided by bill split recommendation engine 416 at consent, confirm, and execute component 420. Custom metadata component 418 may also be configured to present metadata obtained from custom metadata 208 of FIG. 2, as described elsewhere, to the user while viewing the results of bill split recommendation engine 416 and deciding whether to carry out a bill split (for example, a reminder that the bill split was initiated with a voice command to 'split bill four ways' may provide context for determining whether the recommendation is valid). This metadata can optionally be coupled to the result of the bill split recommendation provided to the user at consent, confirm, and execute component 420 for provision to trained data storage 422. Regardless, in an embodiment, whether the user confirms or does not confirm the proposed bill split, or makes any modification, the user's interaction with the bill split recommendation engine 416 is recorded at trained data storage 422 and used as feedback for training of past data model 412.

Figure 6:
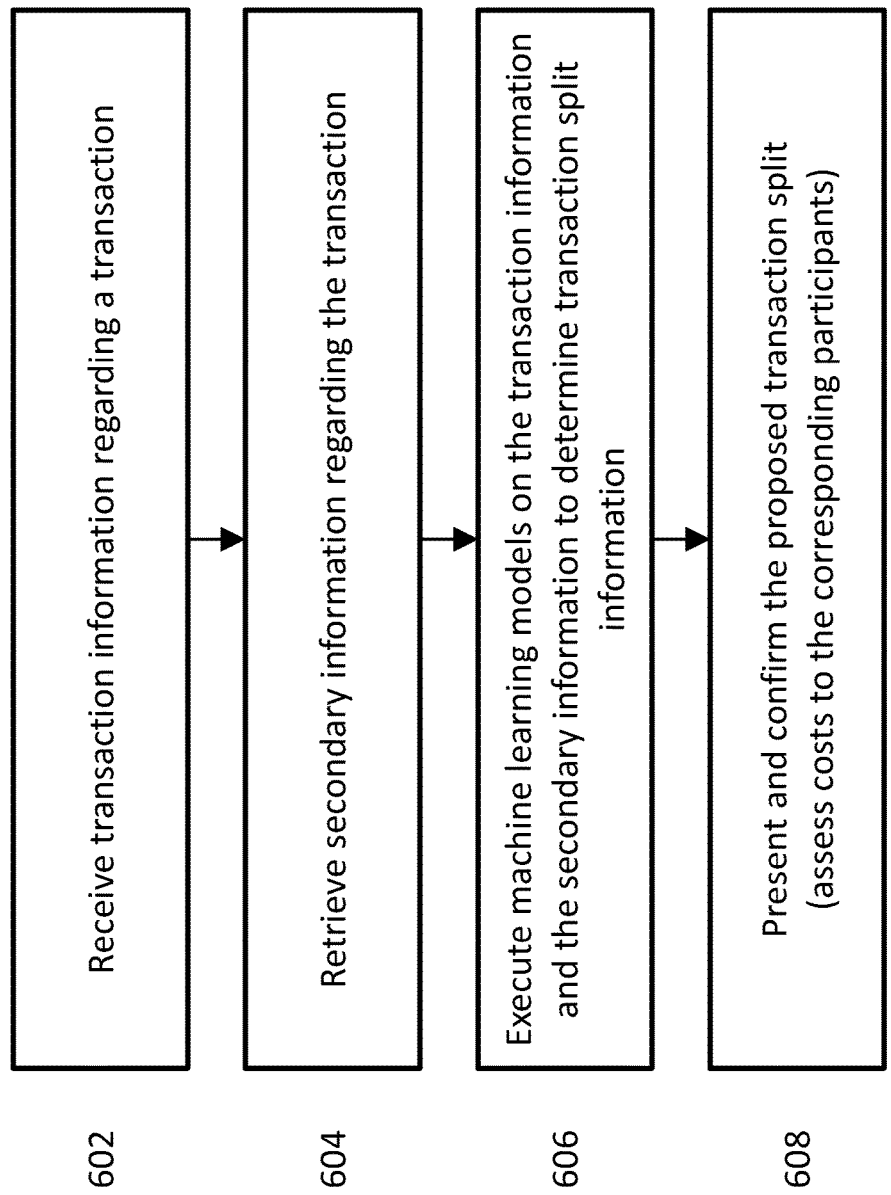
FIG. 6 is a flowchart illustrating steps by which a bill splitting recommendation is determined and provided, in accordance with an embodiment.

FIG. 6 is a flowchart 600 illustrating steps by which a bill splitting recommendation is determined and provided, in accordance with an embodiment. At step 602, transaction information regarding a transaction is received, for example transaction data 402 received at machine learning models 404 of FIG. 4. At step 604, secondary information regarding the transaction is received—this could be contact information (including names and photos) for use by facial recognition model 406, information about restaurant menus and prices received by trigger model 408, and historical bills and billing information received by social media analysis model 410, by way of non-limiting example.

At step 606, machine learning models are executed on the transaction information from step 602 and the secondary information from step 604 to determine transaction split information, in accordance with an embodiment. By way of non-limiting example, bill split recommendation engine 416 of FIG. 4 is configured to receive the results (via tagged data storage 414) of the executed machine learning models 404 against the transaction data 402 and secondary information 403. And, at step 608, a proposed transaction split is presented for confirmation to a user, for example via consent, confirm, and execute component 420.

Figure 7:
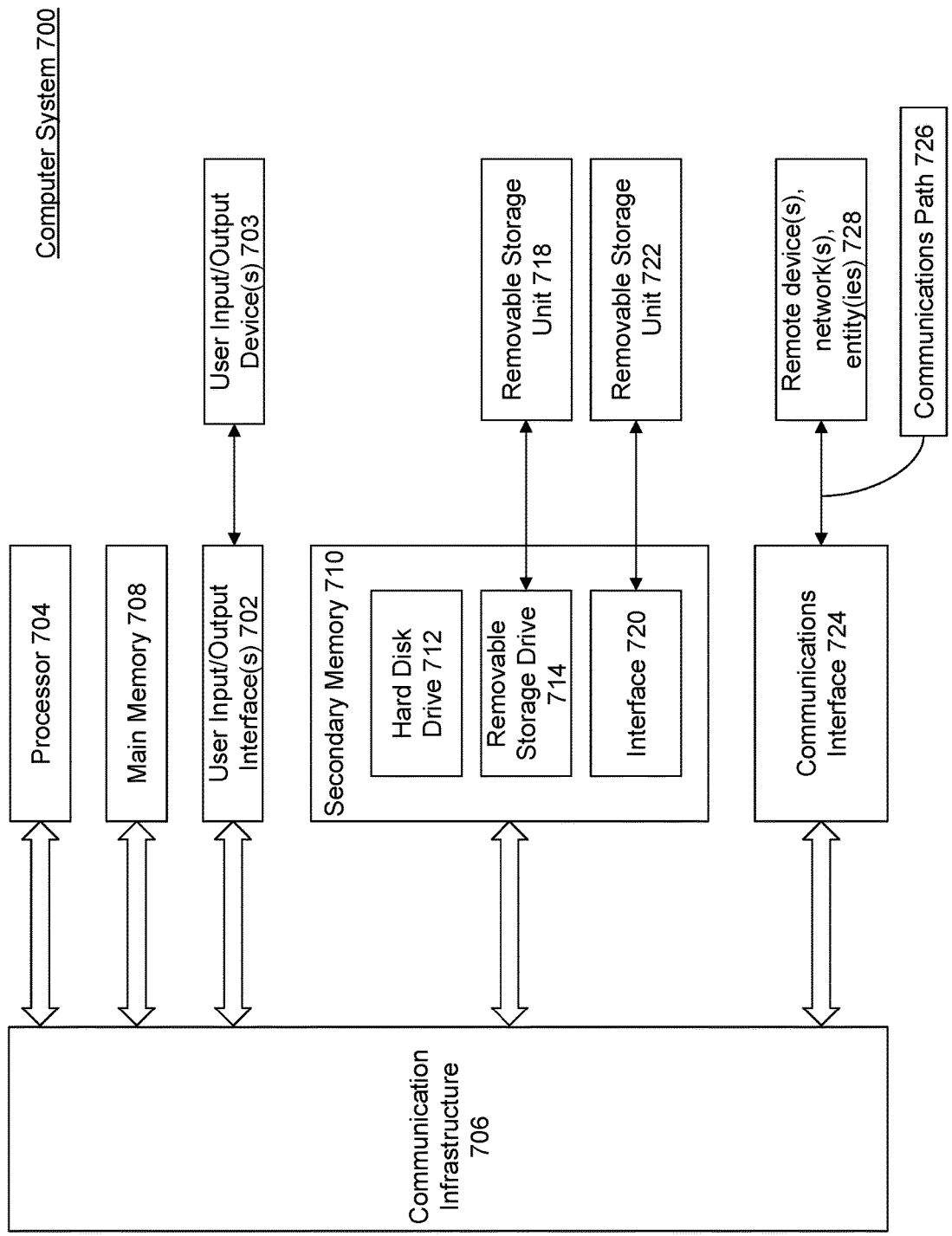
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving, by one or more computing devices, transaction data corresponding to a transaction associated with a merchant;
   retrieving, by the one or more computing devices, secondary information for the transaction from a social network posting, wherein the social network posting indicates an average cost associated with the merchant;
   executing, by the one or more computing devices, a first machine learning model to determine participants in the transaction and a location associated with the transaction based on the transaction data and the secondary information, and a second machine learning model to determine an expected individual allocation associated with the transaction based on the location, the transaction data, and the average cost associated with the merchant;
   calculating, by the one or more computing devices, transaction split information for the transaction comprising an individual allocation for the participants in the transaction based on the expected individual allocation; and
   providing, by the one or more computing devices, the transaction split information for confirmation and assessment of the individual allocation to the participants in the transaction.

2. The computer-implemented method of claim 1, wherein the secondary information comprises historical transaction preferences associated with the participants in at least one of the transaction or a different transaction associated with a merchant, the method further comprising:
   executing, by the one or more computing devices, at least one of the first machine learning model, the second machine learning model, or a third machine learning model to associate an individual cost in the transaction with a participant of the participants in the transaction based on the historical transaction preferences associated with the participants in the transaction,
   wherein the calculating the transaction split information comprises estimating the individual allocation for the participants in the transaction based on the association of the individual cost.

3. The computer-implemented method of claim 1, further comprising:
   receiving, by the one or more computing devices, raw payment information comprising the transaction data; and
   formatting, by the one or more computing devices, the transaction data from the raw payment information.

4. The computer-implemented method of claim 3, wherein the raw payment information comprises an image of a receipt, and wherein the formatting the transaction data is responsive to optical character recognition (OCR) performed on the image of the receipt to obtain unformatted transaction data.

5. The computer-implemented method of claim 1, wherein the providing the transaction split information for confirmation and assessment of the individual allocation to the participants in the transaction further comprises:
   determining, by the one or more computing devices, from the social network posting, at least one social media account associated with the participants in the transaction; and
   sending, by the one or more computing devices, based on contact information identified from the at least one social media account, the transaction split information for confirmation and assessment of the individual allocation to at least one of the participants in the transaction.

6. The computer-implemented method of claim 1, wherein the receiving the transaction data corresponding to the transaction associated with the merchant comprises receiving at least one of image data indicating the transaction data or audio data indicating the transaction data.

7. The computer-implemented method of claim 1, further comprising:
   receiving, by the one or more computing devices, training data corresponding to a confirmation responsive to the providing the transaction split information for confirmation and execution; and
   training, by the one or more computing devices, at least one of the first machine learning model or the second machine learning model using the training data corresponding to the confirmation.

8. A system, comprising:
   a memory configured to store operations; and
   one or more processors configured to perform the operations, the operations comprising:
      receiving transaction data corresponding to a transaction associated with a merchant;
      retrieving secondary information for the transaction from a social network posting, wherein the social network posting indicates an average cost associated with the merchant;
      executing a first machine learning model to determine participants in the transaction and a location associated with the transaction based on the transaction data and the secondary information, and a second machine learning model to determine an expected individual allocation associated with the transaction based on the location the transaction data, and the average cost associated with the merchant;
      calculating transaction split information for the transaction comprising an individual allocation for the participants in the transaction based on the expected individual allocation; and
      providing the transaction split information for confirmation and assessment of the individual allocation to the participants in the transaction.

9. The system of claim 8, wherein the secondary information comprises historical transaction preferences associated with the participants in at least one of the transaction or a different transaction associated with a merchant, the operations further comprising:
   executing, by the one or more computing devices, at least one of the first machine learning model, the second machine learning model, or a third machine learning model to associate an individual cost in the transaction with a participant of the participants in the transaction based on the historical transaction preferences associated with the participants in the transaction, wherein the calculating the transaction split information comprises estimating the individual allocation for the participants in the transaction based on the association of the individual cost.

10. The system of claim 8, the operations further comprising:
receiving raw payment information comprising the transaction data; and
formatting the transaction data from the raw payment information.

11. The system of claim 10, wherein the raw payment information comprises an image of a receipt, and wherein the formatting the transaction data is responsive to optical character recognition (OCR) performed on the image of the receipt to obtain unformatted transaction data.

12. The system of claim 8, the providing the transaction split information for confirmation and assessment of the individual allocation to the participants in the transaction further comprising:
determining, from the social network posting, at least one social media account associated with the participants in the transaction; and
sending, based on contact information identified from the at least one social media account, the transaction split information for confirmation and assessment of the individual allocation to at least one of the participants in the transaction.

13. The system of claim 8, wherein the receiving the transaction data corresponding to the transaction associated with the merchant comprises receiving at least one of image data indicating the transaction data or audio data indicating the transaction data.

14. The system of claim 8, the operations further comprising:
receiving training data corresponding to a confirmation responsive to the providing the transaction split information for confirmation and execution; and
training at least one of the first machine learning model or the second machine learning model using the training data corresponding to the confirmation.

15. A non-transitory computer-readable medium having instructions stored thereon that, when executed by at least one computing device, cause the at least one computing device to perform operations comprising:
receiving transaction data corresponding to a transaction associated with a merchant;
retrieving secondary information for the transaction from a social network posting, wherein the social network posting indicates an average cost associated with the merchant;
executing a first machine learning model to determine participants in the transaction and a location associated with the transaction based on the transaction data and the secondary information, and a second machine learning model to determine an expected individual allocation associated with the transaction based on the location, the transaction data, and the average cost associated with the merchant;
calculating transaction split information for the transaction comprising an individual allocation for the participants in the transaction based on the expected individual allocation;
providing the transaction split information for confirmation and assessment of the individual allocation to the participants in the transaction.

16. The non-transitory computer-readable medium of claim 15, wherein the secondary information comprises historical transaction preferences associated with the participants in at least one of the transaction or a different transaction associated with a merchant, the method further comprising:
executing, by the one or more computing devices, at least one of the first machine learning model, the second machine learning model, or a third machine learning model to associate an individual cost in the transaction with a participant of the participants in the transaction based on the historical transaction preferences associated with the participants in the transaction,
wherein the calculating the transaction split information comprises estimating the individual allocation for the participants in the transaction based on the association of the individual cost.

17. The non-transitory computer-readable medium of claim 15, the operations further comprising:
receiving raw payment information comprising the transaction data; and
formatting the transaction data from the raw payment information.

18. The non-transitory computer-readable medium of claim 17, wherein the raw payment information comprises an image of a receipt, and wherein the formatting the transaction data is responsive to optical character recognition (OCR) performed on the image of the receipt to obtain unformatted transaction data.

19. The non-transitory computer-readable medium of claim 15, the providing the transaction split information for confirmation and assessment of the individual allocation to the participants in the transaction further comprising:
determining, from the social network posting, at least one social media account associated with the participants in the transaction; and
sending, based on contact information identified from the at least one social media account, the transaction split information for confirmation and assessment of the individual allocation to at least one of the participants in the transaction.

20. The non-transitory computer-readable medium of claim 15, wherein the receiving the transaction data corresponding to the transaction associated with the merchant comprises receiving at least one of image data indicating the transaction data or audio data indicating the transaction data.

* * * * *